(No Model.) 4 Sheets—Sheet 1.
C. C. CHILD.
PAPER CUTTING MACHINE.
No. 274,273. Patented Mar. 20, 1883.
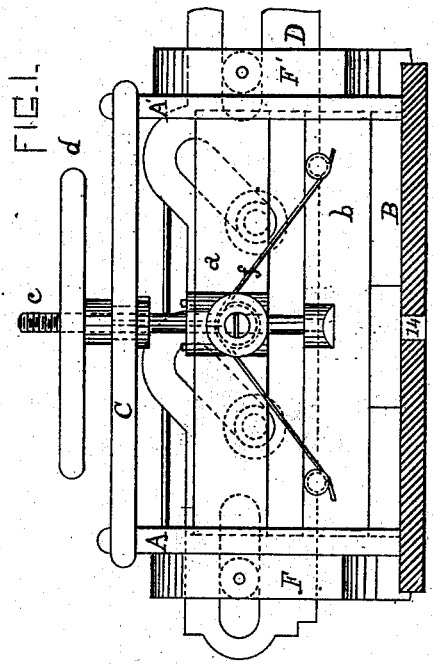
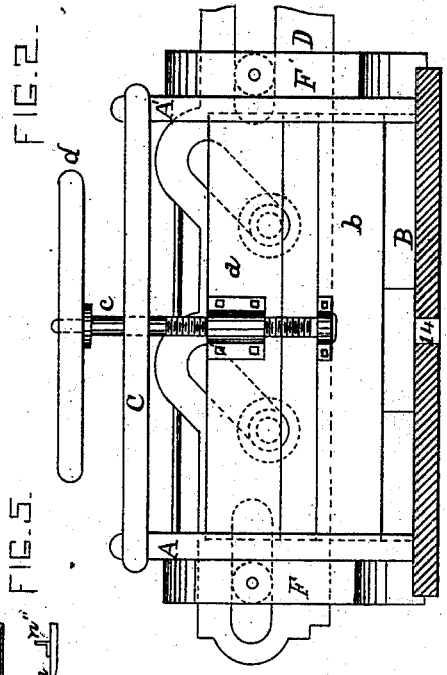
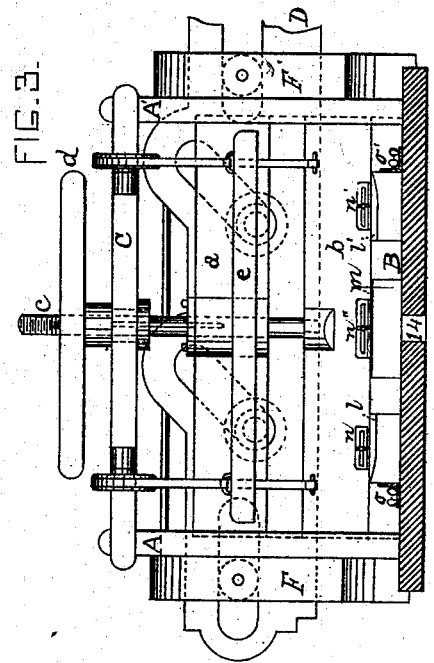
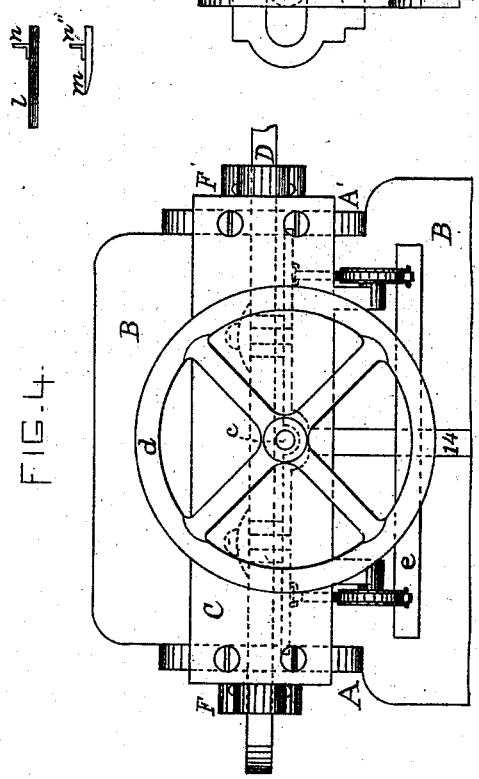
WITNESSES.
Frank D. Witherell
Henry S. Child
INVENTOR.
Cyril C. Child (No Model.) 4 Sheets—Sheet 2.
C. C. CHILD.
PAPER CUTTING MACHINE.
No. 274,273. Patented Mar. 20, 1883.
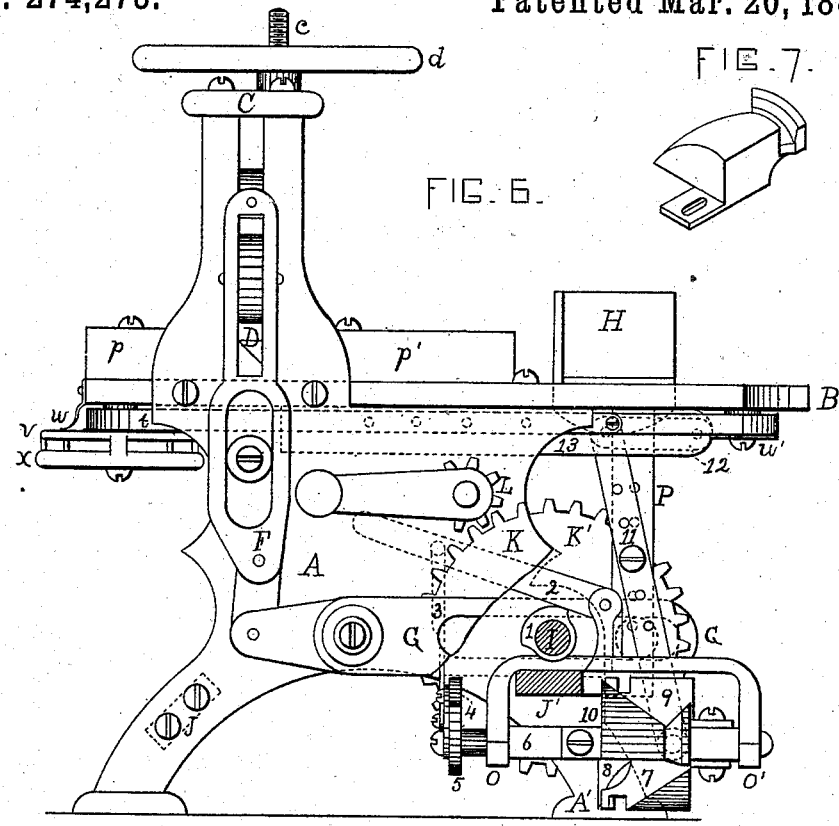
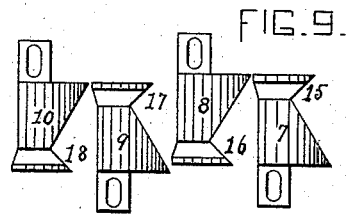
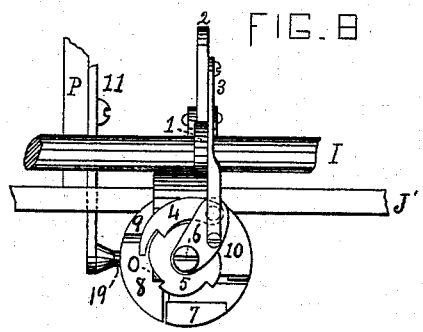
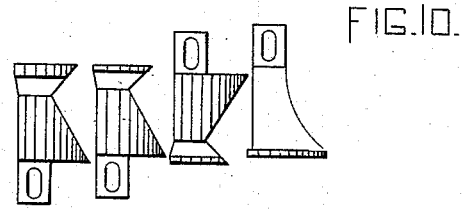
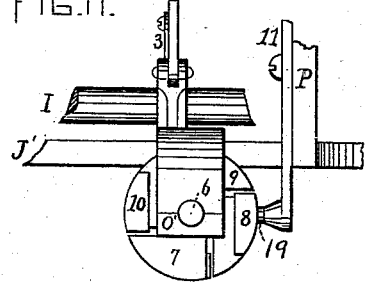
WITNESSES
Frank D. Witherell.
Henry S. Child.
INVENTOR
Cyril C. Child (No Model.) 4 Sheets—Sheet 3.

C. C. CHILD.
PAPER CUTTING MACHINE.

No. 274,273. Patented Mar. 20, 1883.

WITNESSES.
Frank D. Witherell.
Henry S. Child.

INVENTOR.
Cyril C. Child (No Model.) 4 Sheets—Sheet 4.

C. C. CHILD.
PAPER CUTTING MACHINE.

No. 274,273. Patented Mar. 20, 1883.

WITNESSES.
Frank D. Witherell.
B. W. Child.

INVENTOR.
Cyril C. Child

UNITED STATES PATENT OFFICE.

CYRIL C. CHILD, OF BOSTON, MASSACHUSETTS.

PAPER-CUTTING MACHINE.

SPECIFICATION forming part of Letters Patent No. 274,273, dated March 20, 1883.

Application filed April 27, 1880. (No model.)

*To all whom it may concern:*

Be it known that I, CYRIL C. CHILD, of Boston, Massachusetts, have invented a new and useful Improvement in Paper-Cutting Machines, of which the following is a specification.

My invention relates to improvements in operating paper-cutting machines to insure accurate work and save time and labor, which improvements may be applied to different styles of paper-cutters; and it consists, first, in the combination, with a paper-cutting mechanism, of a duplex clamping device composed of two clamping-bars arranged one above the other, and to be operated one automatically, and the other by manual power independently of the first-mentioned bar, or automatically in conjunction therewith.

It further consists of a novel arrangement and combination of devices for automatically moving the back gage for trimming paper to a size.

It further consists in the combination of two supplementary gages mounted upon the back gage and adjustable thereon for the purpose of gaging three sizes of work at the same time.

It further consists in the combination, with the clamp-bar of a paper-cutter, of beveled or tapering supplementary pieces so arranged that an unequal thickness of pile or piles can receive the same pressure of clamp and be cut at the same time.

It further consists in a novel construction and arrangement of devices for indicating the position of the gage, as will be further described.

Figure 12:
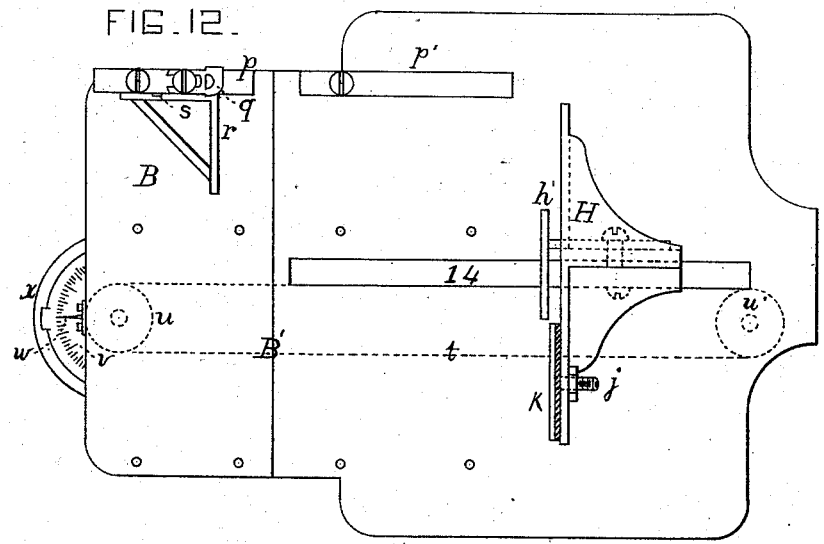
Figure 13:
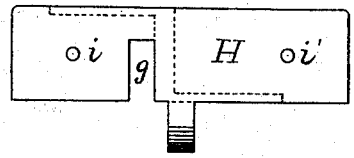
Figure 14:
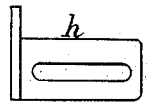
Figure 15:
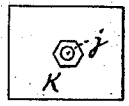
Figure 16:
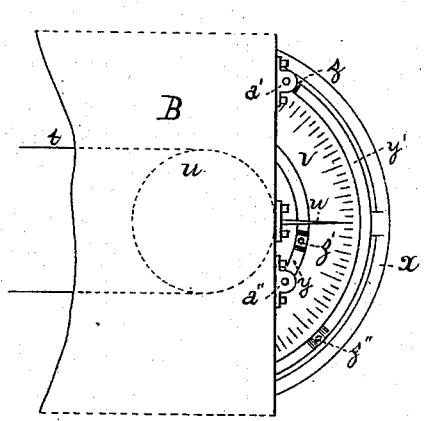
Figure 17:
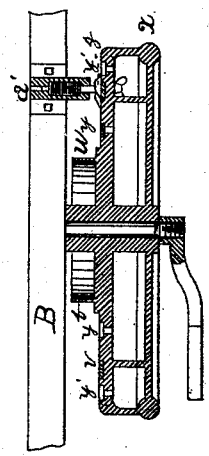
Figure 18:
Figure 19:
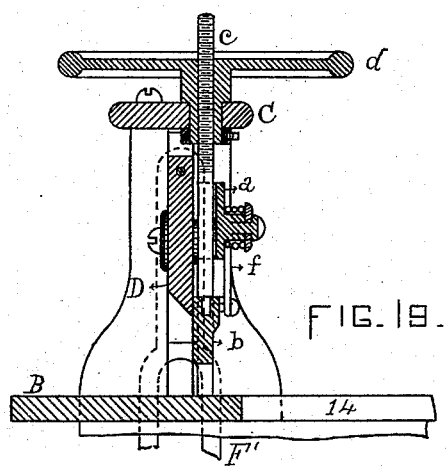
Figure 20:
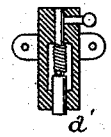
Figure 21:
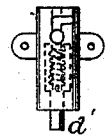

Figures 1, 2, and 3 are rear elevations of that part of the machine above the table, showing three different arrangements of the clamping device. Fig. 4 is a plan of Fig. 3, showing the combined devices for clamping by manual power and automatically. Fig. 5 is a detail of the pieces for clamping unequal thicknesses of work. Fig. 6 is a side elevation, showing the mechanism for moving the back gage automatically. Fig. 7 is a perspective view of one of the cams. Fig. 8 is a front elevation of the automatic back-gage-moving mechanism. Fig. 9 is a detail of the cams projected on a plane surface. Fig. 10 is a similar view illustrating different-shaped cams for a different way of trimming paper. Fig. 11 is a rear elevation of the automatic back-gage-moving mechanism. Fig. 12 is a plan of the table B, showing book-binder's gage and front gage and slot, (B' being the line of knife-edge.) Fig. 13 is a front elevation of back gage. Fig. 14 is a side elevation of adjustable T-piece. Fig. 15 is a plan of plate $k$. Fig. 16 is a plan of the front portion of the table with enlarged indicator band-wheel, band, and the adjustable stops. Fig. 17 is a vertical section of the front band-wheel with adjustable stops. Fig. 18 is a plan and an elevation of stops. Fig. 19 is a vertical section of Fig. 1 through the screw $c$. Fig. 20 is a vertical section of socket-piece and pin $a'$, and Fig. 21 is an elevation of same.

In the first part of my invention, relating to the mechanism for combining both modes of clamping in the same machine, A A', Figs. 1 to 4, are the side frames of a paper-cutting machine; B, the bed on which the paper is placed, and C is the top cap; D, the knife-bar, which may be operated by any of the well-known methods.

The pressure-bar or clamp, which is usually made in one piece, for my improvement I divide longitudinally into two parts, $a$ and $b$, which can be moved vertically in grooves in the side frames, A A'; or the upper part, $a$, may be connected to rods which move vertically, and the lower part, $b$, be guided by these rods. The upper part, $a$, is operated by the automatic clamping mechanism precisely as if the machine was always used to clamp the work automatically. The lower part, $b$, may be connected by screw $c$ to the upper part, $a$, as in Fig. 2, when the turning of the screw $c$ forces clamp $b$ onto the work, holding it while being cut, when reversing the screw returns it to its position; or screw $c$ may be attached to the cap C of the machine, as in Figs. 1, 3, and 4, and acts simply to force the part $b$ onto the work. The lower part, $b$, is held to its highest position by a spring, $f$, or weight, $e$, attached or fulcrumed on the automatic part of clamp $a$, Fig. 1, or to the top cap, C, Figs. 3 and 4. The office of spring $f$ or weight $e$ is to return the lower part, $b$, to its highest position when released by screw $c$, if that is used, or automatic part $a$, if the clamping is done automatically. Screw $c$ is conveniently rotated or forced down by hand-wheel $d$.

The value of this improvement is that in many kinds of work the operator needs to hold the work in position while the pressure is being carefully put on it. For this class of work he uses the screw $c$ to get his pressure on the work. For general work or automatic clamping, screw $c$ is not used. The operator starts his machine and the automatic part of clamp $a$ forces the lower part, $b$, down onto the work, holding it while being cut, the machine returning the automatic part $a$, and spring $f$ or weight $e$ returning the lower part, $b$, to its highest position.

The second part of my invention—that for automatically moving the back gage—consists of a cam, 1, Figs. 6 and 8, on the main shaft I of the machine, so shaped and timed with the machine that it shall raise a lever, 2, while the knife-bar D, to which is attached the knife, is making the last part of its upward motion preparatory for the next cutting by the machine.

Suspended from the free end of the lever 2 is a connection, 3, on which is a pawl, 4. This pawl 4 engages with a four-toothed ratchet-wheel, 5, which is fastened to a shaft, 6, which shaft is at right angles to the main shaft I of the machine, and is journaled in suitable bearings, O O', so that one completed operation of the machine shall act through cam 1, lever 2, rod 3, pawl 4, and ratchet-wheel 5 to revolve shaft 6 one-quarter of a revolution. On shaft 6 are four cams, 7, 8, 9, and 10, Figs. 8 to 11, shaped as shown in Figs. 7, 9, and 10. In a standard, P, rigidly attached to cross-bar J' and bed B, is a vertical series of holes. To this standard is pivoted a vertical lever, 11, that has a corresponding series of holes, this lever being pivoted to standard P by corresponding holes in lever and standard accordingly as more or less motion to the lever 11 is required.

At the lower end of lever 11 is a roll on a stud, which is so placed that it can be acted upon successively by the four cams on the shaft 6, one after each downward movement of the knife-bar, to vibrate the lever 11 backward and forward, or continuously forward, as the cams are set and shaped. At the other end of lever 11, which reaches nearly to the under side of table B, is attached a connecting-rod, 12, the other end of the rod being connected to a horizontal bar, 13, which is placed in line with and on one edge of the slot 4, Fig. 12, said slot being in the center of the table B, and the horizontal bar 13 has an end motion in line with the motion of back gage, H.

In the bar 13 is a series of holes, by any of which it can be connected to a projection from back gage, H, extending down through the slot 14 in the table.

The complete operation of the mechanism when all these parts are connected, as described, in trimming paper on four sides—say fourteen and one-half by seventeen and one-half inches to fourteen by seventeen inches—is to adjust the back gage, H, so it shall be seventeen and one-fourth inches from the knife-edge, and then to place the pile of paper to be cut against the back gage, H. The operating-pinions L L' and gears K K', through their connections, force the knife through the paper and return it to its highest position. During the last part of the upward motion of the knife the cam 1 acts through its train of mechanism to move the back gage forward to fourteen and one-fourth inches from knife, the roll on the stud of the lever 11 being forced by the cam 8, Fig. 9, from the stopping point or lock 15 to the stopping point or lock 16. This mechanism, with the exception of the cam 1, the lever 2, the rod 3, and the pawl 4, now remains stationary until the cut is made and the knife is again on its upward motion, when the cam 1, acting again on its train, moves lever 11, with the back gage, back to seventeen inches, when the cut is made, and again this train of mechanism, taking up its motion, acts through lever 11 to move back gage forward to fourteen inches, (the roll of the lever 11 being now at 18.) This cut, being made at the upward motion of the knife, brings us to our starting point, seventeen and one-fourth inches from the knife—point 15 on the cam 7.

The operator is released from any attention to the back gage and saves so greatly in his work that the machine can be run through the four cuts without stopping, if desired, the paper having been moved by the operator one-quarter of a revolution after it has been released by the clamp and before it has again been fastened by the clamp.

Some operators prefer to move the paper one-half of a revolution instead of one-quarter, to accomplish which the cams may be shaped and arranged as shown in Fig. 10. By this mode of trimming the paper one motion of the back gage is made by hand, which can be done readily, when the back gage is moved, by a metallic band or wire rope, as in the operation of this machine. The band or wire rope does not require to be detached from the back gage while using this mechanism. The ratchet-wheel 5 can have more or less teeth, and a corresponding number of cams of any shape can be attached to shaft 6 as the work may require. The series of holes in bar 13 are so arranged that the back gage can be adjusted to different distances from the knife. The series of holes in lever 11 and standard P are used for the purpose of permitting more or less motion to be given to the lever 11 and the back gage, H. The cams on the shaft 6 may also be adjustable.

The third part of my invention relates to mechanism for cutting the front end of one book, the head of another, and the tail of a third at the same time.

Heretofore in arranging the gage of a paper-cutter for cutting more than one size at a time, when split or adjustable parts of a gage are used, there has been a difficulty of readjusting them for regular work. In my device I take my regular gage H, Figs. 6, 12, and 13, and cut an opening, g, in its face, through which I adjust the T-piece h, Figs. 12 and 14. On either side of the opening in the regular gage I drill holes i or i', through either of which I pass the bolt j, fastened to the plate K, Figs. 12 and 15. As both of these pieces are adjustable in front of the back gage, two sizes can be cut, while the other end of the regular gage gages the size of the third cut. By this arrangement the main gage is not disturbed in adjusting the supplementary gages, and said main gage, extending across the machine in one piece, cannot be got out of line by such adjustment.

The fourth part of my invention for cutting uneven piles, as books with raised band backs, is accomplished with supplementary pieces, l l' m, as shown in Figs. 3 and 5. These pieces may be of metal, wood, or binder's board, to which are attached angle-irons n n' n'', by which I attach pieces l, l', and m to the back of clamp b, so that one edge of the piece shall extend under the clamp and come close up to the line of the knife-edge. This gives a pressure on the work as near as possible to the line of cutting, while the other part extends back over the work, and may be made so as to cover the entire work, if desired. The piece m is beveled on its rear edge, so as to accommodate the different thicknesses of the back while cutting the front. Pieces l l' are beveled on one edge to accommodate the back in cutting top and bottom. o o' are side guides for the books, to insure the pieces striking the books as they should when the clamp comes down. These pieces may be of any shape to accommodate the work, and the guides may be vertically true or lean toward or from the work, or on a curve to fit a round back.

The fifth part of my invention relates to the adjustable stops for the back gage.

In many kinds of work it is desirable, when duplicate sizes are to be cut, for the operator to be able to arrest his gage at certain fixed points without examining closely his indicator, to accomplish which the band-wheel x, Figs. 16 and 17, is formed with circular slots or grooves y y', which are turned out true, and to which one or more socket-pieces, z z' z'', are fitted. These socket-pieces pass through the grooves, and are clamped at any position in the circle of the grooves by thumb-screws. The socket-pieces rise slightly above the side of the wheel, and have in their centers holes, and are beveled off each way on the line of circle from the holes. They are shaped on the circle of the grooves, and need not be over one inch, measured on the circle, and can be clamped one for every inch on each circle, making by that arrangement a stop for every one-half-inch motion of the band t, and as that is attached dirctly to the back gage that would consequently have but one-half-inch motion to cut one-half-inch strips.

On the edge of the front table, B, I put two stops, a' a'', each consisting of sockets fastened to the front table, in which is fitted a vertically-movable pin. These pins are forced endwise and down by springs, and are long enough to enter holes in socket-pieces z z' z'', and are raised out of these holes by latches attached to these pins, and so arranged that a slight revolution of pins shall bring the latches onto ledges of the sockets, to lock the pins up out of the holes in socket-pieces z z' z''.

The operation of these devices is as follows: After setting the socket-pieces z, z', and z'' in their proper positions in the grooves y and y' of the wheel X for the job in hand, the operator releases the desired pin for the cut that is first to be made, and turns the wheel till said pin drops into the first hole in the circle of motion corresponding thereto, and then brings down the knife to make a cut. He then raises the pin previously released, and releases the other pin, and again turns the wheel till said second pin finds and drops into the first hole in the circle of motion corresponding thereto, when a second cut may be made.

What I claim as new, and desire to secure by Letters Patent of the United States, is—

1. In combination with a paper-cutting mechanism, a duplex clamping device composed of two clamping-bars arranged one above the other, and to be operated one automatically, and the other by manual power independently of the first-mentioned bar, or automatically in conjunction therewith.

2. In a self-clamping paper-cutter, the combination of the self-clamping part a, handclamp b, weight e, and screw c, substantially as and for the purpose described.

3. In a paper-cutting machine, the combination of the back gage, H, bar 13, connecting-rod 12, lever 11, cams 7, 8, 9, and 10, shaft 6, ratchet-wheel 5, rod 3, pawl 4, lever 2, cam 1, and the revolving-shaft I, all arranged and adapted to operate substantially as described.

4. The rotary shaft 6, in combination with the sectional cams 7, 8, 9, and 10, adjustably secured thereon as a means of imparting to the lever 11, and through it to the back gage, H, a variable intermittent motion, substantially as described.

5. In an automatic device for moving the back gage of a paper-cutter, the shaft 6, with its cams intermittently revolved by means substantially as described, in combination with the lever 11, substantially as and for the purpose set forth.

6. In an automatic device for moving the back gage of a paper-cutter, the shaft 6, with cams, substantially as described, in combination with an adjustable fulcrumed lever, 11, bar 13, and back gage, H.

7. The combination, in a paper-cutting machine, of the gage H, having a straight front face extending substantially across the table of the machine, parallel with the cutting-knife, and the two supplementary gages K and h, attached thereto and adapted to be moved therewith, and independently adjusted thereon toward or from the knife, whereby three different widths of paper may be cut at the same time, substantially as described.

8. In combination with the clamping-bar of a paper-cutting machine, one or more supplementary blocks detachably secured thereto, and having one portion thereof beveled or thinner than another portion, substantially as described, for the purposes specified.

9. The combination of the gage H, the flexible band $t$, the wheel X, one or more adjustable socket-pieces, $zz'z''$, fitted to said wheel, and one or more stop-pins, $a'\ a''$, mounted upon the table B, all arranged and adapted to operate substantially as described, for the purpose specified.

CYRIL C. CHILD.

Witnesses:
 FRANK D. WITHERELL,
 HENRY S. CHILD.